United States Patent Office 2,966,476
Patented Dec. 27, 1960

2,966,476

ANTIOXIDANT COMPOSITION FOR POLY-OXYMETHYLENES

Robert Daniel Kralovec and Paul Noel Richardson, Wilmington, Del., assignors to E. I. du Pont de Nemours and Company, Wilmington, Del., a corporation of Delaware No Drawing. Filed July 26, 1956, Ser. No. 600,159

5 Claims. (Cl. 260—45.95)

This invention relates to a stabilized polyoxymethylene, and, more particularly, it relates to a class of novel, non-discoloring antioxidants for the stabilization of high molecular-weight, film-forming polyoxymethylenes.

Polyoxymethylenes can now be prepared in the form of a tough, high molecular-weight, film-forming polymer. By further treatment the polyoxymethylene may be reacted with carboxylic acid anhydrides in such a manner as to produce ester groups at the ends of the polyoxymethylene chains, and thereby to protect the chains from depolymerizing by degradation of the end groups. Such an esterified polyoxymethylene may be degraded by chain cleavage due to severe oxidation or attack by acids. It is the purpose of this invention to provide a polyoxymethylene stabilized by a particularly desirable antioxidant.

The term "polyoxymethylene," wherever used in this description and in the appended claims, is intended to include those polymers in which the polymer chain consists of recurring —(CH$_2$O)— units. If the chain is terminated by hydroxyl groups, methyl groups, carboxylate groups, or some other group, the polymer is still within the term "polyoxymethylene" if the chain structure is (CH$_2$O)$_n$ since the chain structure constitutes over 99% of the polymer weight and is determinative of the polymer characteristics. Thus, polyoxymethylene glycol, polyoxymethylene dicarboxylate, and polyoxymethylene diether are all intended to be encompassed within the term "poloxymethylene."

In copending patent application Serial No. 327,693 filed by R. N. MacDonald on December 23, 1952, now abandoned, there are disclosed and claimed a series of phenols which are useful as antioxidants for polyoxymethylenes. Many of these phenols, although providing good protection against attack by oxygen, cause the color of the protected polyoxymethylene to be altered radically. Untreated polyoxymethylene has a milky white appearance. Polyoxymethylene treated with many other phenolic compounds quickly becomes tan, dark brown, or even black after being exposed to the atmosphere or to sunlight. In addition, certain of the simpler phenolic compounds volatilize at low temperatures, and are therefore not as effective at high temperatures as the more complicated phenols, e.g. those having two or more benzene rings.

It is an object of this invention to provide an improved, non-staining antioxidant for use with polyxymethylene. Other objects will appear in the more detailed description of this invention which follows.

These objects are accomplished by incorporating into a high molecular-weight polyoxymethylene an antioxidant composition having one of the following symmetrical molecular structures:

(1) 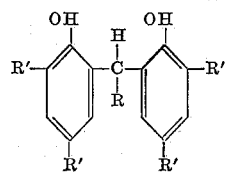

(2) 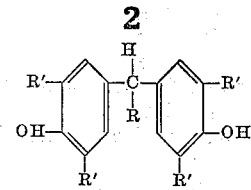

(3) 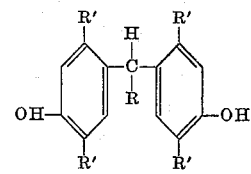

wherein R=methyl, ethyl, or n-propyl and R'=an alkyl group. Particularly desirable antioxidant compounds of this invention are ones in which R is n-propyl and R' is either methyl or tertiary-butyl, for example, 2,2'-butylidene bis(4,6 dimethyl phenol) and 4,4'-butylidene bis(3-methyl-6-tertiary-butyl phenol). An especially desirable composition is one comprising a white, high molecular weight polyoxymethylene diacetate and 0.01% to 5.0% by weight of 4,4'-butylidene bis(3-methyl-6-tertiary-butyl phenol) or 2,2'-butylidene bis(4,6-dimethyl phenol). Each of these compositions has been found to be capable of being subjected to the action of milling rolls for 10 minutes in air at 200° C. without causing any substantial decrease in the number average molecular weight of the polyoxymethylene.

The above-described antioxidant compositions are all phenols, but they differ in their properties from other phenols by exhibiting a combination of two characteristics: (1) They provide protection against oxidative degradation of polyoxymethylenes which is as good as, or better than, that of any other known phenols, and (2) they do not impart any discoloration to the polyoxymethylene. Other phenolic structures fail in one or both of these characteristics. Amine stabilizers provide excellent antioxidant powder, but they cause a brown or black discoloration. Other known antioxidants for polyoxymethylenes, such as ureas or hydrazines, also have proven to be less desirable in the production of non-discolored products than the specific phenols of this invention.

In order to provide the best polyoxymethylene composition from a standpoint of stability, resistance to oxidation, whiteness, and moldability, three ingredients are believed to be important. The basic polymer should be a polyoxymethylene dicarboxylate or a polyoxymethylene diether; that is, a polyoxymethylene which is esterified or etherified so as to place an ester group or an ether group on each end of the chain. Secondly, the basic polymer should be thermally stabilized by the presence of 0.1% to 10% by weight of a high molecular-weight polyamide. Thirdly, the polymer should be protected from oxidative attack by the presence of one of the antioxidant compositions of this invention. The combination of these three ingredients produces the best white, non-oxidizable, thermally stable polyoxymethylene known.

The antioxidant provides protection against a different degradation mechanism than does the polyamide stabilizer. It has been found that the polyamide serves to prevent impurities from attacking the ends of the polyoxymethylene chains, which might otherwise become unstable and release formaldehyde units one at a time to give the effect of unraveling or unzipping the chain of —(CH$_2$O)— units. The ends of the chains preferably are ester or ether groups which inherently are more resistant to attack than hydroxyl groups, but, even so, a polyamide should be present to prevent removal of the ester or ether end-groups. The antioxidant, on the other hand, guards the polyoxymethylene chain against cleavage by oxygen attack. It is, therefore, apparent that the most desirable polyoxymethylene composition is a mixture of polyoxymethylene dicarboxylate or polyoxymethylene diether protected by a polyamide thermal stabilizer and a phenolic antioxidant described in this invention. The importance of an antioxidant may be judged from the fact that the Flow Number (described hereinafter) remains relatively constant when an antioxidant is present, while, on the other hand, the Flow Number of the polyoxymethylene increases when an antioxidant is not present.

The amount of antioxidant that may be used is variable in that increasing amounts, above the minimum requirements, produce no harmful effects. A suitable range might include from 0.01% to 5% by weight of the polyoxymethylene being protected, although the preferred, economical range, which will provide adequate protection, is from 0.1% to 1.0%.

In the following examples certain terms have been employed to designate test results of the polymeric compositions protected by the antioxidants of this invention.

Syringe stability ($SS_{222}$) is a measure of the rate at which the polymer degrades at 222° C.

The units of $SS_{222}$ are ml. of gas evolved per gram of polymer per 10 minutes elapsed time at 222° C. The $SS_{222}$ of a polymeric sample is determined by heating a weighed sample of polymer in a hypodermic syringe at 222° C. and observing the position of the syringe cylinder at 10 and 20 minutes after the beginning of the test. The syringe which is used should be well cleaned, and preferably should be about 50 ml. in volume. Polymer, in the form of a pressed pellet or molding powder cubes is weighed to the nearest 0.001 gram and placed in the syringe, which is lubricated between the piston and the cylinder with a high quality inert oil or grease such as a polysilicone. The syringe is evacuated and filled with nitrogen several times. Silicone oil is drawn into the syringe and ejected until about 5 ml. remains, surrounding the polymer serving as a means for expelling all gases prior to the test and as a heat transfer medium during the test. The nozzle of the syringe is then sealed and the syringe is placed in a vapor bath at 222° C. The vapor bath may be vapors of methyl salicylate. The position of the syringe cylinder is noted at 10 minutes and 20 minutes after the syringe is first place in the vapor bath. If desired, the test may be carried on to 30 minutes or more. The change in the position of the syringe piston over a 10 minute period determines the amount of gas evolved in the test and, thus, the amount of polymer which has degraded to monomer or other gas. Thus, a value of 5.0 for $SS_{222}$ indicates an evolution of 5 ml. of gas per gram of polymer over the period from 10 to 20 minutes after the beginning of the test. If some other interval of time is employed herein, it will be indicated.

The thermal degradation of polyoxymethylenes generally follows that predicted for a first-order reaction. From time to time there may be observed a slight variation from a first-order reaction, but it has been found that for all practical purposes the kinetics of a first-order reaction define this degradation reaction.

The thermal stability of polyoxymethylene has been reported in certain other instances as a reaction rate constant for thermal degradation at 222° C. ($k_{222}$) in units of percent by weight of the polymer which degrades per minute at 222° C. In United States Patent 2,768,994 issued to R. N. MacDonald on October 30, 1956 certain polyoxymethylenes are claimed which have a $k_{222}$ of less than 1% by weight per minute. The relationship between $k_{222}$ and $SS_{222}$ may be closely approximated through the following equation:

$k_{222}$ (percent/min.)

$$= \frac{\text{(volume of gas in ml. evolved in time } t) \times 0.07}{\text{(time } t \text{ in minutes)} \times \text{(initial weight of polymer sample in grams)}}$$

The factor 0.0736 is a constant calculated on the assumption that all of the evolved gas is monomeric formaldehyde and that it behaves as an ideal gas. Based on the above equation it may be seen that an approximate comparison of $k_{222}$ and $SS_{222}$ is as follows:

| $k_{222}$ (percent by weight/min.): | $SS_{222}$ (ml. gas/10 min./gram of polymer) |
|---|---|
| 1.0 | 136 |
| 0.5 | 68 |
| 0.1 | 14 |
| 0.05 | 7 |
| 0.01 | 1.4 |

Another physical property employed in the characterization of the compositions of this invention is "Flow Number." This property is of value in the qualitative determination of the moldability of the composition. Flow Number has also been found to have a definite correlation with the number average molecular weight of the composition. The test is conducted by charging a convenient amount (5 grams is sufficient) of polymer into the cylinder of a melt indexing machine, the cylinder being maintained at 200° C. and being fitted with an extrusion orifice having a diameter of 0.0413±0.0002 inch and a length of 0.158±0.001 inch. The piston (weighing 60 grams) is inserted into the cylinder and is loaded with a weight of 5000 grams. At an elapsed time of 5 minutes after the polymer is charged into the cylinder, the extrudate coming out of the orifice is cut off and discarded. At a total elapsed time of 6, 7, 8, 9, and 10 minutes, the extrudate is cut off and weighed to an accuracy of ±1%. The weights of these 5 extrudates are plotted versus time, and the best straight line is drawn through the five plotted points. The intercepts at 5 and at 10 minutes elapsed time are multiplied by 10 and reported as the Flow Number in grams/10 minutes at 5 minutes elapsed time and at 10 minutes elapsed time. An increase in Flow Number may be translated into a decrease in number average molecular weight. Thus, if the antioxidant is satisfactory, it should maintain the Flow Number of the polyoxymethylene being protected at a substantially constant value during the extrusion periods mentioned in the above test. A more realistic test is the one employed in the following examples where the antioxidant-containing polymer is subjected to the action of milling rolls in air at 200° C. for 10 minutes with substantially no change occurring in the Flow Number of the polymer because of this treatment.

*Examples 1–17*

The importance of the use of an antioxidant in the protection of a high-molecular weight, esterified polyoxymethylene was shown by milling polyoxymethylene containing 1% by weight of a polyamide thermal stabilizer (terpolymer of approximately 38% polycaprolactam/35% polyhexamethylene adipamide/27% polyhexamethylene sebacamide). The mill was operated at 200° C. in air. The Flow Number of the composition exhibited a 9-fold increase (3.6 to 33.0) in 10 minutes time on the mill. By incorporating approximately 0.2% by weight of a suitable antioxidant the Flow Number remains practically constant over such a period of milling.

In the following Table I there are listed the results of incorporating 0.2% by weight of the indicated antioxidant compositions into a high molecular-weight esterified polyoxymethylene containing 1% by weight of the above-mentioned polyamide, and having a Flow Number of 1.5, and milling at 200° C. in air for 10 minutes.

TABLE I

| Example | Antioxidant Composition | Syringe Stability (ml./gm.) | | | | Flow Number | | Color |
|---|---|---|---|---|---|---|---|---|
| | | 0-10 min. | 10-20 min. | 20-30 min. | 30-40 min. | 5 min. | 10 min. | |
| 1 | 4,4'-butylidene bis(3-methyl-6-tertiary-butyl phenol) | 3.0 | 5.0 | 6.0 | 8.5 | [1] 4.8 | 4.8 | White. |
| 2 | 2,2'-butylidene bis(4,6-dimethyl phenol) | 1.0 | 2.75 | 4.75 | 6.5 | 1.9 | 1.9 | Do. |
| 3 | 2,2'-butylidene bis(4-methyl-6-tertiary butyl phenol) | 0.7 | 1.25 | 3.0 | 4.5 | 1.6 | 1.6 | Do. |
| 4 | 2,2'-butylidene bis(4-tertiary-butyl-6-methyl phenol) | 2.5 | 8.0 | 9.5 | | 3.3 | 3.3 | Do. |
| 5 | 2,2'-ethylidene bis(4-methyl-6-tertiary butyl phenol) | 1.0 | 2.75 | 4.25 | 6.0 | 1.6 | 1.7 | Do. |
| 6 | 2,2'-methylene bis(4,6-dimethyl phenol) | 1.25 | 3.0 | 4.75 | 6.5 | 1.7 | 1.7 | Tan. |
| 7 | 2,2'-methylene bis(4-methyl-6-tertiary butyl phenol) | | | | | [2] 3.4 | [2] 3.5 | Pink. |
| 8 | 2,2'-methylene bis(4-ethyl-6-tertiary butyl phenol) | | | | | [2] 4.0 | [2] 3.8 | Do. |
| 9 | 4,4'-methylene bis(2,6-ditertiary-butyl phenol) | 2.0 | 5.0 | 7.5 | 9.0 | 2.5 | 2.8 | Yellow. |
| 10 | 4,4'-methylene bis(2-methyl-6-tertiary-butyl phenol) | 2.5 | 7.5 | 10.0 | | 2.6 | 2.6 | Do. |
| 11 | 4,4'-methylene bis(2,6-dimethyl phenol) | 2.5 | 7.5 | 11.5 | | 3.0 | 3.0 | Do. |
| 12 | 2,2'-methylene bis(4-tertiary-butyl-6-phenyl phenol) | 3.75 | 8.75 | 11.0 | | 5.7 | 5.6 | Tan. |
| 13 | 2,2'-dihydroxy-3,3',5,5'-tetramethyl stilbene | 7.0 | 11.0 | | | | | White. |
| 14 | 2,2'-isopropylidene bis(4-methyl-6-tertiary-butyl phenol). | 11.7 | 21.0 | | | | | Do. |
| 15 | Methylene bis(beta-naphthol) | 1.25 | 2.5 | 5.0 | 7.0 | 2.1 | 2.1 | Brown. |
| 16 | 1,5-dihydroxy naphthalene | 1.0 | 2.75 | 7.5 | 10.5 | 1.8 | 1.9 | Black. |
| 17 | Control (without antioxidant but otherwise the same) | 5.0 | 9.5 | 10.0 | | [3] 33.0 | | White. |

[1] Polyoxymethylene starting material had a flow number of 2.4 prior to milling.
[2] Polyoxymethylene starting material had a flow number of 3.1 prior to milling.
[3] Polyoxymethylene starting material had a flow number of 3.6 prior to milling.

The above tabulation illustrates the fact that certain substituted phenols provide good protection against oxidation and at the same time do not stain the polymer, which is white in its unmodified state. Other compounds stain the polymer although good protection against oxidation is provided. Still other compositions retain the white color but fail to provide the desired protection against oxidation. Examples 1–5 illustrate the antioxidant compositions found to provide both the property of non-staining and that of a desirable protection against oxidation. Examples 6–14 illustrate that structures similar to those of Examples 1–5 do not provide both of these properties. Methylene, ethylene, and isopropylidene bridges joining the two phenol groups appear to be undesirable, while ethylidene and butylidene bridges are desirable. Other phenols are shown in Examples 15–16.

The actual weight loss experienced in milling compositions, such as those of Examples 1–5, for a period of two hours at 200°–205° C. varied from about 3.6% to 7.0% by weight of the composition initially placed on the milling rolls.

Example 18

The polymeric composition of Example 1 was mixed with water in the weight proportion of 1 part polymer to 2 parts water. The mixture was heated at 54° C. for 28 days and at the end of that time the water was analyzed and found to contain less than 3 parts per million of the phenolic antioxidant, indicating that prolonged extraction of the polymeric composition does not remove the antioxidant.

The polyoxymethylene employed in this invention may be prepared by polymerizing formaldehyde in the presence of any of a wide variety of initiators. The polyoxymethylene product is one which is described and claimed in United States Patent 2,768,994 issued to R. N. MacDonald on October 30, 1956. The polyoxymethylene is described therein as having a degree of toughness of at least 1 or a reaction rate constant for thermal degradation at 222° C. of less than 1% by weight per minute. The degree of toughness is determined by the consecutive steps of compression-molding the polyoxymethylene into a film 3–7 mils in thickness, heating the film in air at 105° C. for 7 days, cooling the film to room temperature, manually folding and creasing the film along a line, and reversing the fold and creasing along the same line without a break occurring in the film along that line. The reaction rate constant for thermal degradation at 222° C. is related to the syringe stability as mentioned above, a syringe stability of 136.0 being approximately equal to a reaction rate constant of 1% by weight per minute.

It has been found that the composition of this invention is particularly useful for the manufacture of pressure containers such as surge tanks on pumping systems or bottles for spraying liquids with a gaseous propellant under pressure. These polyoxymethylene compositions are remarkably impermeable to water, alcohol, many other organic compounds, and inert gases. Because of the tensile strength, toughness, and the retention of strength properties at elevated temperatures, polyoxymethylene is more desirable for this purpose than any other plastic material known. Other uses for the composition of this invention include extrusion, injection-molding, and blow-molding in the manufacture of films, fibers, filaments, sheets, rods, tubes, tapes, and irregularly shaped objects such as bottles, toys, gears, and dishes. The polyoxymethylene composition may be modified by the incorporation of pigments, fillers, printing, or decorative matter.

We claim:

1. A moldable, non-discolored, antioxidant-containing high molecular-weight polyoxymethylene composition comprising a high molecular-weight polyoxymethylene containing from 0.01% to 5% by weight of a phenolic antioxidant having a symmetrical molecular structure and being selected from the group consisting of those compounds having the structure:

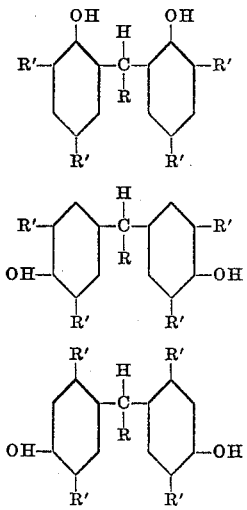

wherein R is selected from the group consisting of methyl, ethyl, and propyl, and R' is an alkyl group of 1–4 carbon atoms; the said polyoxymethylene being selected from the group consisting of polyoxymethylene glycol, polyoxymethylene dicarboxylate, and polyoxymethylene diether, and being further characterized by exhibiting a reaction rate constant for thermal degradation at 222° C. of less than 1% by weight per minute.

2. The composition of claim 1 in which said polyoxymethylene is from the group consisting of polyoxymethylene dicarboxylate and polyoxymethylene diether.

3. A white, moldable, polyoxymethylene composition comprising a high molecular-weight polyoxymethylene diacetate and 0.01% to 5% by weight of 4,4'-butylidene bis(4-methyl-6-tertiary-butyl phenol), said composition being capable of being subjected to the action of milling rolls for 10 minutes in air at 200° C. without causing any substantial decrease in the number average molecular weight of said polyoxymethylene.

4. A white, moldable, polyoxymethylene composition comprising a high molecular-weight polyoxymethylene diacetate and 0.01% to 5% by weight of 2,2'-butylidene bis(4,6-dimethyl phenol), said composition being capable of being subjected to the action of milling rolls for 10 minutes in air at 200° C. without causing any substantial decrease in the number average molecular weight of said polyoxymethylene.

5. A moldable, non-discolored, antioxidant-containing composition comprising a high molecular weight polyoxymethylene dicarboxylate having a reaction rate constant for thermal degradation at 222° C. of less than 1% by weight per minute and containing 0.01% to 5.0% by weight of a phenolic antioxidant having a symmetrical molecular structure and being selected from the group consisting of those compounds having the structure:

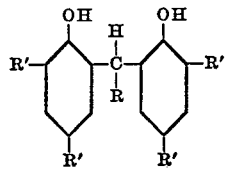

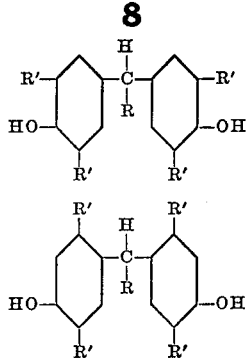

wherein R is selected from the group consisting of methyl, ethyl, and propyl, and R' is an alkyl group of 1–4 carbon atoms.

References Cited in the file of this patent

UNITED STATES PATENTS

| | | |
|---|---|---|
| 2,538,355 | Davis | Jan. 16, 1951 |
| 2,706,189 | Pruitt | Apr. 12, 1955 |
| 2,731,442 | Forman | Jan. 17, 1956 |
| 2,871,220 | MacDonald | Jan. 27, 1959 |

FOREIGN PATENTS

| | | |
|---|---|---|
| 748,856 | Great Britain | May 9, 1956 |
| 753,299 | Great Britain | July 18, 1956 |

UNITED STATES PATENT OFFICE
CERTIFICATION OF CORRECTION

December 27, 1960

Patent No. 2,966,476

Robert Daniel Kralovec et al.

It is hereby certified that error appears in the above numbered patent requiring correction and that the said Letters Patent should read as corrected below.

Column 1, line 53, for "adition" read -- addition --; line 59, for "polyxymethylene" read -- polyoxymethylene --; column 3, line 43, after "polymer" insert -- pellet --; column 4, line 5, in the equation, for "0.07" read -- 0.0736 --; lines 62 and 63, for "polycarprolactam" read -- polycaprolactam --; column 7, line 9, for "bis(4-methyl-6-tertiary-butyl phenol)" read -- bis(3-methyl-6-tertiary-butyl phenol) --.

Signed and sealed this 23rd day of May 1961.

(SEAL)
Attest:

ERNEST W. SWIDER
Attesting Officer

DAVID L. LADD
Commissioner of Patents